(12) United States Patent
Schiariti et al.

(10) Patent No.: US 11,473,529 B2
(45) Date of Patent: Oct. 18, 2022

(54) INNER COATING LAYER FOR SOLID-PROPELLANT ROCKET ENGINES

(71) Applicant: AVIO S.P.A., Rome (IT)

(72) Inventors: Daniele Schiariti, Rome (IT); Paolo Bellomi, Rome (IT)

(73) Assignee: AVIO S.P.A., Rome (IT)

( * ) Notice: Subject to any disclaimer, the term of this patent is extended or adjusted under 35 U.S.C. 154(b) by 365 days.

(21) Appl. No.: 16/755,060

(22) PCT Filed: Oct. 11, 2018

(86) PCT No.: PCT/IB2018/057895
§ 371 (c)(1),
(2) Date: Apr. 9, 2020

(87) PCT Pub. No.: WO2019/073436
PCT Pub. Date: Apr. 18, 2019

(65) Prior Publication Data
US 2020/0318575 A1 Oct. 8, 2020

(30) Foreign Application Priority Data
Oct. 13, 2017 (IT) .......................... 102017000115687

(51) Int. Cl.
*F02K 9/34* (2006.01)
*F02K 9/32* (2006.01)

(52) U.S. Cl.
CPC ............... *F02K 9/346* (2013.01); *F02K 9/32* (2013.01); *F05D 2230/90* (2013.01); *F05D 2300/211* (2013.01); *F05D 2300/2102* (2013.01); *F05D 2300/431* (2013.01); *F05D 2300/433* (2013.01); *F05D 2300/502* (2013.01); *F05D 2300/608* (2013.01); *F05D 2300/611* (2013.01); *F05D 2300/614* (2013.01)

(58) Field of Classification Search
CPC ........ F02K 9/346; F02K 9/32; F05D 2230/90; F05D 2300/2102; F05D 2300/211; F05D 2300/431; F05D 2300/433; F05D 2300/502; F05D 2300/608; F05D 2300/611; F05D 2300/614
USPC ........................................................ 523/138
See application file for complete search history.

(56) References Cited

U.S. PATENT DOCUMENTS

| 4,501,841 | A * | 2/1985 | Herring | C08K 5/0025 |
| | | | | 524/567 |
| 2006/0073282 | A1* | 4/2006 | Bourdoncle | F02K 9/346 |
| | | | | 427/372.2 |
| 2007/0149629 | A1* | 6/2007 | Donovan | C08L 79/08 |
| | | | | 521/134 |
| 2007/0261385 | A1* | 11/2007 | Gajiwala | F02K 9/974 |
| | | | | 60/200.1 |
| 2014/0255635 | A1* | 9/2014 | Morgan | C04B 35/62863 |
| | | | | 428/221 |

\* cited by examiner

*Primary Examiner* — John Cooper
(74) *Attorney, Agent, or Firm* — McGlew and Tuttle, P.C.

(57) ABSTRACT

An inner coating layer for solid-propellant rocket engines, constituted by a material comprising from 45% to 55% wt. of a a cross-linkable, unsaturated-chain polymer base, from 11% to 13% wt. of silica, from 15% to 25% wt. of vulcanizing agents and plasticizers, from 5% to 7% wt. of aramid fiber and from 10% to 15% wt. of microspheres made of a material selected among glass, quartz and nano clay, having diameter lower than 200 μm, density comprised between 0.30 and 0.34 g/cc and resistance to hydrostatic pressure greater than, or equal to, 4500 psi.

11 Claims, No Drawings

INNER COATING LAYER FOR SOLID-PROPELLANT ROCKET ENGINES

TECHNICAL FIELD

The present invention relates to a new inner coating layer for solid-propellant rocket engines. The inner layer of the invention advantageously has improved thermal-ablation performance and reduced density. In this way, it is possible to have a product that can ensure higher protection of the casing of the solid-propellant rocket engine and, at the same time, minimize the inert mass thus maximizing the payload.

Rocket engines usually comprise a substantially cylindrical casing filled with solid propellant, a device for igniting the propellant and a converging-diverging nozzle used to accelerate hot gases outwards. The casing is usually made of steel or composite material, such as carbon fiber or Kevlar® fiber.

The thermal protection of the casing during the propellant combustion is ensured by means of an inner coating layer made of ablative material, which is substantially composed of rubber added with additives. The inner coating layer is necessary as the thermal environment resulting from the propellant combustion is very aggressive. The inner coating shall be therefore made of a material adapted to resist very high temperatures, thermal-mechanical loads and a chemically aggressive gas. A simple elastomer matrix usually cannot ensure suitable insulation performances and it is therefore necessary to add suitable charges and fibers in order to improve the operational behavior. Particularly, the elastomer matrices generally used for producing the inner thermal protections of solid-propellant rocket engines (EPDM, NBR, SBR, HTPB) have limited resistance against high flows with significant thermal erosion load, as well as poor mechanical properties, even though they have good thermal insulation properties and are chemically compatible with the combustion gases produced by the solid propellant of the rocket engine.

The mass of a solid-propellant rocket engine is comprised of payload, i.e. the mass that is directly involved in the production of thrust, and inert mass, i.e. the mass that is necessary to ensure the operation of the rocket engine but is not directly involved in thrust production.

Nowadays, part of the researches in the field of solid-propellant rocket engines is focused on minimizing the inert mass in favor of the payload.

As it is well known to those skilled in the art, the inner coating layer necessarily increases the inert mass of the rocket engine.

The object of the invention is to provide an inner coating layer made of an ablative material, which has a reduced effect on the inert mass without however compromising the protection properties thereof.

SUMMARY OF THE INVENTION

The invention concerns an inner coating layer for solid-propellant rocket engines, whose main features are set forth in claim 1, and whose preferred and/or auxiliary features are set forth in claims 2-5.

DETAILED DESCRIPTION

As used hereinafter the term "vulcanization system" is to be understood as a complex of vulcanizing agents that are added to the mixture in a final mixing step, and that promote vulcanization of the polymer base when the mixture is brought to the vulcanization temperature.

As used hereinafter the term "crosslinkable, unsaturated-chain polymer base" is to be understood as any natural or synthetic non-crosslinked polymer, adapted to gain all the chemical-physical and mechanical features typically gained by elastomers following cross-linking (vulcanization).

Below, an embodiment is described just by way of non-limiting example.

The inner coating layer of the invention for solid-propellant rocket engines has been prepared in a Banbury mixer according to the following steps:

as crosslinkable unsaturated-chain polymer base, EPDM has been loaded in the Banbury mixer, the speed of rotation of the rotors being comprised between 10 rpm and 30 rpm, and mixing has continued until the polymer base has achieved a temperature comprised between 40° C. and 60° C.;

then, the speed of rotation of the rotors being always comprised between 10 rpm and 30 rpm, the para-aramid fiber in dried form has been added, and mixing has continued until the mixture has achieved a temperature comprised between 45° C. and 65° C.; it has been experimentally verified that if the aramid fibers added to the mixture are in dried form, they are more effective;

once the rotors have been stopped, silica and the other ingredients, except peroxide and glass micro-spheres, have been added to the mixture. Then mixing has been performed, with a rotor speed comprised between 10 rpm and 30 rpm, up to achieve a mixture temperature comprised between 55° C. and 75° C.;

then, the rotors have been stopped again and the glass micro-spheres have been added; mixing has started again with the rotor speed comprised between 10 rpm and 30 rpm up to achieve a pre-mixture temperature comprised between 60° C. and 80° C.;

lastly, keeping the rotor speed unchanged (between 10 rpm and 30 rpm), peroxide has been added in gradual and continuous manner, uniformly distributed along the mixture surface. Once peroxide has been completely added, mixing is continued in order to homogenize the mixture.

The prepared mixture constitutes the ablative material to be used for realizing the inner coating layer of the present invention. The mixture has been then removed from the mixer and put in the calendar for the final calendering step.

Table I shows the mixture composition, in wt %, of the inner layer of the invention for solid-propellant rocket engines.

Table I also shows the composition, in wt %, of an EPDM-based comparison mixture, which is generally used for preparing an inner layer for solid-propellant rocket engines.

TABLE I

| | Comparison mixture | Invention mixture |
|---|---|---|
| EPDM | 54 | 48 |
| Silica | 27 | 12 |
| Aramid fiber | — | 6 |
| Glass micro-spheres | — | 12 |
| Secondary components (vulcanizing agents, accelerators and elements adapted to improve processability of the final product) | 19 | 22 |

The micro-spheres have diameter of 180 μm, density of 0.33 g/cc, conductivity of 0.19 W/m° K and resistance to hydrostatic pressure equal to 4500 psi.

The values for the spheres fall within the ranges indicated in the attached claims and detailed here below: diameter lower than 200 μm; density comprised between 0.30 and 0.34 g/cc; conductivity comprised between 0.07 and 0.22 W/m° K; resistance to hydrostatic pressure greater than, or equal to, 4500 psi.

In this regard, glass micro-spheres have been tested having greater density than that indicated above and lower resistance to hydrostatic pressure than that indicated above. The mixture produced with these micro-spheres has not shown the desired advantages in terms of mass reduction. In fact, it has been shown that the spheres that do not meet the required values in terms of density and resistance to hydrostatic pressure, are damaged during the industrial calendering step to such an extent as to be no longer intact.

From the mixtures described above, respective inner coating layer have been produced.

With laboratory tests it has been verified that the inner coating layer of the invention has reduced heat conductivity and higher specific heat than the inner coating layer made with the comparison mixture. In this way, the reduced density is balanced, obtaining similar thermal diffusivity and therefore, given the same thickness installed, equal properties in terms of thermal insulation, with a 20% reduction in inert mass.

Tables 2-4 below respectively show the obtained values of thermal conductivity, specific heat and density.

TABLE 2

Thermal conductivity [W/m° K.]

| | Comparison layer | Invention layer |
|---|---|---|
| Average | 0.260 | 0.235 |
| Minimum | 0.242 | 0.230 |
| Maximum | 0.269 | 0.240 |

TABLE 3

Specific heat [J/kg° K.]

| | Comparison layer | Invention layer |
|---|---|---|
| Average | 1708.800 | 1810.000 |
| Minimum | 1692.000 | 1792.200 |
| Maximum | 1740.000 | 1843.000 |

TABLE 4

Density [kg/m³]

| | Comparison layer | Invention layer |
|---|---|---|
| Average | 1098.000 | 867.000 |
| Minimum | 1090.000 | 860.000 |
| Maximum | 1110.000 | 880.000 |

Tests have been also performed to compare the ablation characterization of the inner layer made of the mixture according to the invention and the inner layer made of the standard mixture.

Table 5 shows the values of specific erosion speed normalized with respect to the maximum value measured for the two rubbers. The values in Table 5 show that the two materials have similar behavior in a thermal flow interval, similar to that expected inside the combustion chamber of solid-propellant rocket engines.

TABLE 5

Erosion speed

| Q [W/m²] | Comparison layer | Invention layer |
|---|---|---|
| 750000 | 0.84 | 0.83 |
| 800000 | 0.88 | 0.89 |
| 850000 | 0.94 | 0.96 |
| 900000 | 0.99 | 0.97 |
| 950000 | 1.00 | 0.99 |

Finally, the present invention ensures that the inner coating layer, given the same technical performances, has a lower thickness and a lower density than the prior art inner coating layers. The thickness and density reduction allows reducing the inert mass to the advantage of the payload that the solid-propellant rocket engine can put into orbit. This advantage is a result of the improvements provided by the technical features of the invention in terms of thermal insulation, of increased thermal-ablative properties and of reduced density.

In particular, the presence of silica inside the elastomer matrix of the inner coating layer allows improving the thermal insulation characteristics as well as the mechanical properties.

The increased heat capacity of the mixture and the reduced conductivity obtained by charging silica into the main matrix, allow reducing the thickness of the thermal protection installed in the engine that, through conductivity, ensures insulation of the casing.

The presence of aramid fibers inside the polymer matrix of the inner coating layer, in addition to increasing the mechanical properties of the rubber, also ensures high resistance to erosion and significantly increased ablative properties. In fact, this type of reinforcement provides for anchoring the degraded material to the virgin matrix, thus avoiding thermal-erosion. In other words, this reinforcement avoids that the virgin material is exposed to the hot gases of the chamber, thus limiting degradation phenomena and allowing the use of the surface carbonized layer as heat insulator even when the degradation has finished. The effect described above, thanks to a reduction of the heat protection thicknesses that shall be installed to safeguard the casing, allows a reduction in inner mass to the advantage of payload. In other words, the thickness reduction has been obtained thanks to both increased thermal-ablative properties of the rubber that can better insulate the composite thanks to a reduced thermal diffusivity, and to the formation of a degraded layer with optimal refractory and mechanical properties and adapted to ensure high resistance to the thermal-fluid-dynamic environment inside the combustion chamber.

In this regard, it shall be noted that the ablative thermal protection during the decomposition phenomenon due to the severe thermal-chemical environment to which the combustion chamber is subjected, shall not show significant erosion phenomena, that could require initial thicknesses of the materials that would be not compatible with the requirements in terms of payload. The erosion effect on the thermal protection is guided by thermal and chemical degradations, as well as by fluid-dynamic actions inside the chamber tending to remove the degraded material on the surface thus exposing greater portions of still virgin material to the hot flow.

The presence of hollow glass micro-spheres inside the polymer matrix of the inner coating layer entails a reduction in the density and thermal conductivity of the material, due to the creation of artificial spaces inside the polymer matrix, with a direct impact on the inner mass, given the same thicknesses of inner thermal protection. Lastly, in view of the above description, it is clearly apparent that modifications and variant can be done to the described method of creating hollow spaces, without however departing from the protective scope of the invention.

In particular, the creation of hollow spaces in the matrix could be also provided in different way than that described, for example by means of quartz or nano clay micro-spheres.

The invention claimed is:

1. An inner coating layer for solid-propellant rocket engines, the inner coating comprising:
an ablative material comprising from 45% to 55% wt. of a cross-linkable, unsaturated-chain polymer base, from 11% to 13% wt. of silica and from 15% to 25% wt. of vulcanizing agents and plasticizers, the ablative material further comprising from 5% to 7% wt. of aramid fiber and from 10% to 15% wt. of micro-spheres made of a material selected among glass, quartz and nano clay, the micro-spheres having a diameter lower than 200 μm, the micro-spheres having a density comprised between 0.30 and 0.34 g/cc and the micro-spheres having a resistance to hydrostatic pressure greater than or equal to 4500 psi.

2. The inner coating layer of claim 1, wherein the micro-spheres have conductivity comprised between 0.07 and 0.22 W/m° K.

3. The inner coating layer of claim 2, wherein the polymer base is at least one of EPDM, NBR, SBR and HTPB.

4. The inner coating layer of claim 2, wherein the aramid fiber is one of Kevlar® and Twaron®.

5. The inner coating layer of claim 2, wherein the aramid fiber is added in dried form.

6. The inner coating layer of claim 1, wherein the polymer base is comprised in the group constituted by EPDM, NBR, SBR, HTPB.

7. The inner coating layer of claim 6, wherein the aramid fiber is one of Kevlar® and Twaron®.

8. The inner coating layer of claim 6, wherein the aramid fiber is added in dried form.

9. The inner coating layer of claim 1, wherein the aramid fiber is Kevlar® or Twaron®.

10. The inner coating layer of claim 9, wherein the aramid fiber is added in dried form.

11. The inner coating layer of claim 1, wherein the aramid fiber is added to a mixture in dried form.

* * * * *